United States Patent [19]

Sookikian et al.

[11] 4,241,407
[45] Dec. 23, 1980

[54] ELECTRONIC SCALE

[75] Inventors: Dennis M. Sookikian, Oak Park, Ill.; Dumitru Gudea, Whittier, Calif.

[73] Assignee: Triner Scale and Manufacturing Co., Chicago, Ill.

[21] Appl. No.: 48,388

[22] Filed: Jun. 14, 1979

[51] Int. Cl.³ .................... G06F 11/02; G01G 19/413
[52] U.S. Cl. .................................. 364/567; 177/25; 364/466; 364/571
[58] Field of Search ........ 364/567, 466, 571; 177/25, 56

[56] References Cited
U.S. PATENT DOCUMENTS

| | | | |
|---|---|---|---|
| 3,594,735 | 7/1971 | Furlong et al. | 364/567 X |
| 3,635,297 | 1/1972 | Salava | 364/466 X |
| 3,769,498 | 10/1973 | Hino et al. | 364/567 X |
| 4,044,846 | 8/1977 | Matilammen | 364/567 X |
| 4,063,604 | 12/1977 | Rock | 364/567 X |
| 4,064,954 | 12/1977 | Rock | 364/567 X |
| 4,080,657 | 3/1978 | Caldicott et al. | 364/567 |
| 4,139,892 | 2/1979 | Gudea et al. | 364/567 |
| 4,143,724 | 3/1979 | Itani | 364/567 X |
| 4,159,521 | 6/1979 | Hall et al. | 364/466 |

Primary Examiner—Edward J. Wise
Attorney, Agent, or Firm—Pasquale A. Razzano

[57] ABSTRACT

An electronic scale having a load cell and a converter for providing successive digital weight signals corresponding to time-samples of the output signal. A circuit for providing a statistical approximation of actual weight produces a weight-representing signal. The latest digital weight signal provided by the converter is compared to the weight-representing signal to determine if the difference therebetween is within a predetermined range and, if so, the latest digital weight signal is added to the statistical approximation. The weight-representing signal represents either a zero weight in the absence of an object, or the weight of an object which is placed upon the load cell. A zero storage register stores the zero weight and, if a predetermined number of digital weight signals differs from the weight-representing signal, the digital weight signals included in the statistical approximating circuit is replaced by the latest digital weight signal whereupon the weight-representing signal then produced by the statistical approximating circuit is supplied to a weight storage register. The difference between the contents of the weight storage register and the zero weight register represents the net weight of the object.

23 Claims, 4 Drawing Figures

ELECTRONIC SCALE

RELATED APPLICATIONS

Application Ser. No. 816,724, filed July 18, 1977, entitled "Electronic Postage Scale", by Gudea, Bryant and Chan.

BACKGROUND OF THE INVENTION

This invention relates to an electronic scale and, more particularly, to an electronic postage scale, the scale having an improved automatic "zero adjustment" feature, an automatic weight-tracking feature and an automatic initializing feature. In an embodiment to be described, the electronic postage scale is provided with an electronic micro-processor unit for carrying out various operations, including a parcel weighing operation, a calculating operation for calculating the required postage in accordance with the weighed parcel, a selected destination zone and a selected class of shipment, and a displaying operation wherein pertinent information corresponding to the weight and calculated postage of the parcel are displayed.

The postage required to ship a parcel to a desired destination is dependent upon the weight of the parcel, the particular destination zone and the class of shipment by which that parcel is to be shipped. It has been proposed, such as in the disclosure of the aforementioned patent application, to provide an automatic electronic postage scale which includes a weight-measuring device for determining the weight of the parcel, and a keyboard by which an operator can enter pertinent information relating to the selected class of shipment, the destination zone and various extra charges, such as insurance and the like, associated with the shipment of that parcel. Electronic circuitry, preferably in the form of a micro-processor unit, responds to the measured parcel weight and the data which is introduced by the user in operating the keyboard to calculate the proper postage for that parcel. This postage is displayed and, if desired, a suitable postage meter can be operated to fix the correct postage to the parcel.

In the postage scale disclosed in the aforementioned application postage is determined by multiplying the measured parcel weight by the postage rate per unit of weight which is associated with the selected class of shipment and selected destination zone. Consequently, large electronic storage tables which store the postage rate for each incremental weight of a parcel that is to be shipped via each available class of shipment to each possible destination zone need not be provided. This is a significant improvement over earlier postage scales which incorporated such electronic storage tables, such as the postage scale described in application Ser. No. 652,820, filed Jan. 27, 1976 by Gudea. By obviating such electronic storage tables, the quantity of memory capacity can be reduced or otherwise used for carrying out additional operations. Since memory capacity is a significant factor in the cost of electronic postage scales, such cost can be reduced by obviating the need for the heretofore required electronic storage tables. Of course, there are limits to the reduction of such memory capacity, such as if various postage rates are not uniformly linear. In that event, electronic storage tables are needed for the nonlinear postage rate ranges.

It is known to use a load cell in various measuring devices, including postage scales. The use of a load cell in such an environment is described in aforementioned application Ser. No. 816,724, and in U.S. Pat. No. 4,064,954 to Rock. A conventional load cell is formed of strain guages connected in a circuit for producing a weight-indication signal. This advantageously avoids the necessity of providing a complex mechanical assembly consisting of levers, springs, and the like for producing the weight-indicating signal. Although no moving parts are needed, the output signal from the load cell which generally is an analog signal, is highly dependent upon temperature, age of the load cell, and other factors. This dependency results in an output signal whose level fluctuates even if the weight or load placed upon the load cell is fixed. Such fluctuations in the output signal of the load cell can result in corresponding fluctuations in the weight measurement and, consequently, in the postage which is determined for the weighed parcel.

To overcome this drawback in the use of a load cell, it has been proposed, in this and other Rock patents (such as U.S. Pat. Nos. 3,951,221; 4,036,316; 4,043,412; and 4,063,064) to convert the output signal produced by the load cell to digital signals, and then to average those digital signals over a period of time. Such averaging is intended to reduce the effect of a significant fluctuation in one digital signal. Hence, the averaged signals are used as a representation of the weight of the parcel. Typically, in the postage scale described in these patents, the average weight is derived on a so-called rotating basis wherein a preset number of digital weight signals are averaged, with the latest incoming digital weight signal replacing the oldest digital weight signal. These patents also describe a "zero adjustment" operation wherein an accurate zero weight reference is maintained even in the presence of expected load cell drift. In this operation, in the absence of a load upon the load cell, an averaged no-load weight is subtracted from a reference level to produce a net weight. This net weight is compared to zero, and if the absolute value of the net weight is greater than zero but less than some predetermined amount, the net weight is incremented or decremented by a much smaller amount toward zero by incrementing or decrementing the reference level. This process continues in successive sampling times until the net weight is exactly zero.

In application Ser. No. 816,724, load cell drift is taken into account by averaging digital weight signal samples in order to avoid anticipated changes in the weight signal due to fluctuations in the output from the load cell. Also, a zero adjustment operation is carried out by comparing a digital no-load weight signal sample to an immediately preceding digital no-load weight signal sample. If the difference between these samples is less than a predetermined amount, then the latest no-load sample is used as a zero reference level. This zero reference level subsequently is subtracted from a gross digital weight signal to produce a true net parcel weight.

Other proposals to correct for drift in the output of a load cell, and primarily, no-load or zero level drift, are described in U.S. Pat No. 3,916,173 to Williams, Jr. and also in U.S. Pat. No. 3,986,012, to Loshbough. In the systems described in these patents, an analog offset voltage is applied to an amplifier which amplifies the output signal produced by the load cell. Zero-level drift is compensated by this analog offset voltage.

It is proposed, in accordance with one aspect of the present invention, to provide an improved technique for avoiding deleterious influences upon a weight-measuring operation in a weighing scale due to the inherent fluctuations in a load cell. An improved technique for obtaining a statistical approximation of the actual weight signals is disclosed. Furthermore, an improved automatic zero-adjustment technique, together with a steady-state weight-adjustment technique are provided. In addition, an initializing operation, or "start-zero" operation, is described, wherein an initial zero reference level is determined during a start-up or zero-reset mode.

OBJECTS OF THE INVENTION

Therefore, it is an object of the present invention to provide an improved scale, and particularly an improved electronic postage scale.

Another object of this invention is to provide an improved scale wherein a zero-weight or reference level automatically is adjusted in order to compensate for drift.

A further object of this invention is to provide an improved scale wherein an initial zero-weight level is determined during an initializing operation which serves to reset the scale to a zero-weight level.

Various other objects, advantages and features of the present invention will become readily apparent from the ensuing detailed description, and the novel features will be particularly pointed out in the appended claims.

SUMMARY OF THE INVENTION

In accordance with this invention, an electronic scale is provided with a load cell for producing an output signal representing the weight of an object, and a converter for providing successive digital weight signals corresponding to time-samples of the output signal. A circuit is provided for obtaining the statistical approximation of the actual weight signal, this circuit including a summing circuit for summing the successive digital weight signals and a dividing circuit for dividing the sum of the digital weight signals by a count equal to the number of digital weight signals which are included in the sum, to produce a weight-representing signal. Before a digital weight signal is added to the summed signals, it is compared to the weight-representing signal. If this latest digital weight signal is within a predetermined range of the weight-representing signal, it is added to the sum. However, if this latest digital weight signal is not within the predetermined range, it is discarded. If a predetermined number of digital weight signals are discarded, the circuit for obtaining the statistical approximation of the actual weight is reset, as by substituting the latest digital weight signal for the summed signals and resetting the count to a count of 1.

The electronic scale also includes an initializing circuit which is operative when the scale first is turned on or when a zero-reset operation is carried out. In this initializing circuit, a predetermined count is detected, representing that a predetermined number of digital weight signals are within the aforementioned predetermined range of the weight-representing signal, the detection of this predetermined count being used to store the weight-representing signal in a zero storage register as a zero-weight, or reference, level.

The electronic scale also includes a zero-adjustment circuit whereby, in the absence of a load on the load cell, the stored zero-weight level is changed as the aforementioned weight-representing signal changes. In the event that a predetermined number of digital weight signals differ from the stored zero-weight level in the manner described above, as when an object is placed upon the load cell, the stored zero-weight level is "latched" and the new weight-representing level is stored in a weight storage register. All subsequent changes in the weight-representing signal are used to update the contents of the weight storage register, which contents represent the weight of the object. Thus, if a predetermined number of digital weight signals differ from the weight signal stored in the weight storage register, the weight-representing signal is modified in the manner described above. The net weight of the object is determined by subtracting the zero-weight level from the stored weight signal.

It is one feature of this invention to modify the weight-representing signal during either a zero-adjustment operation or a weighing operation by detecting when the count (which is used for dividing the summed digital weight signals) reaches a preselected number, and then resetting that count to a lower number and then dividing the summed digital weight signals included in the summing circuit by a factor which is equal to the ratio of the preselected number to the lower, reset number.

BRIEF DESCRIPTION OF THE DRAWINGS

The following detailed description, given by way of example, will best be understood in conjunction with the accompanying drawings in which.

DETAILED DESCRIPTION OF CERTAIN ONES OF THE PREFERRED EMBODIMENTS

Figure 1:
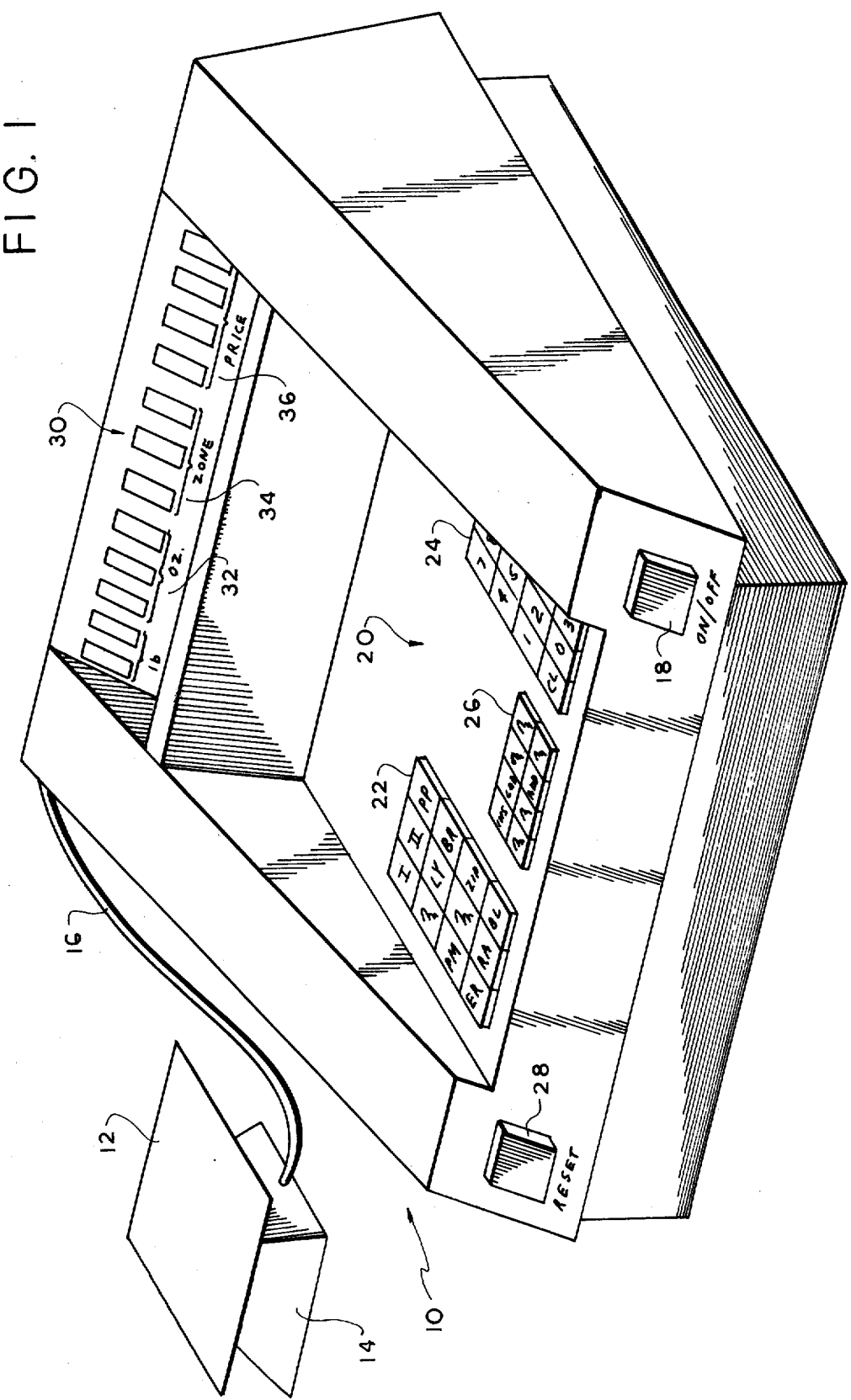
FIG. 1 is a perspective view of an electronic postage scale with which the present invention finds ready application.

Referring now to the drawings, wherein like reference numerals are used throughout, and in particular to FIG. 1, there is illustrated a perspective view of an electronic postage scale in accordance with the present invention. The electronic postage scale is similar to that described in aforementioned application Ser. No. 816,724 and is formed of two basic components: a weighing platform 12 and postage scale electronics, generally designated by reference numeral 10. Weighing platform 12 is comprised of a load cell 14 which includes essentially no moving parts for providing an electrical output signal indicative of the weight of an object placed upon weighing platform 12. The load cell is formed of strain gauges connected in a circuit for producing a weight-indication signal which is tramsitted via cable 16 to postal scale electronics 10.

As shown in FIG. 1, postal scale electronics 10 includes a power supply switch 18, a keyboard 20, a reset key or switch 28, and a visual display 30. Power supply switch 18 is adapted to be manually operated so as to supply operating voltage and current to the electronic system constituting postal scale electronics 10. Any suitable switch and power supply electronics may be used for this purpose.

Keyboard 20 preferably includes a set of class-of-service keys 22, a set of numeric keys 24 and a set of special services keys 26. The class-of-service keys are adapted to be selectively manually operated when postal scale electronics 10 is used to calculate the correct postage for shipping a parcel to a preselected destination zone via any one of various classes of service which are available. Accordingly, class-of-service keys 22 include individual keys for selecting U.S.P.S. services, such as first class, second class, third class, parcel post, priority mail and book rate; and UPS services, such as interstate, intrastate and blue label. Also included in the set of class-of-service keys 22 is a ZIP-to-zone selector key whereby, when this key is activated, postal scale electronics 10 carries out a conversion operation whereby a keyed-in ZIP code destination is converted to a zone designation which is used in determining the correct postage.

Numeric keys 24 are formed of individual keys corresponding to numerals 0, 1, . . . 9, and additionally include a clear key CL whereby an inadvertent or erroneous keyboard entry will be cleared, thereby avoiding erroneous operation of postal scale electronics 10. Numeric keys 24 are selectively operable so as to enter, or key in, data corresponding to a selected destination zone, a destination ZIP code or other numeric information which can be used by postal scale electronics 10, such as data representing a standard weight which can be used during a calibration operation, described in application Ser. No. 816,724.

Special services keys 26 include various individually operable keys for selecting particular services used in shipping parcels, such as an insurance key INS which, when operated, enables numeric keys 24 to be selectively actuated for providing an additional insurance fee which is to be taken into account in calculating postage, a COD key for enabling numeric keys 24 to be selectively actuated for providing a COD fee to be taken into account when calculating postage, etc. Special services keys 26 also include an addition key ADD which, when actuated, enables postal scale electronics 10 to add the special services fee (e.g. insurance, COD, etc.) to the calculated postage.

Reset key 28 is manually operable and is adapted to reset postal scale electronics 10 to a reference, or zero-weight, level. As will be described below, it is possible that, over a prolonged period of time, the zero-weight level against which the weight of a parcel is compared during a weighing operation, may vary, or drift. Selective actuation of reset key 28 takes such "zero drifting" into account in re-establishing the correct reference level for determining the weight of a parcel. Reset key 28 also can be operated to determine a tare weight for subsequently weighed parcels, or objects. In another operable mode, the weight of an object placed upon weighing platform 12 may be compared to a desired weight, such as some standard weight, or other reference level, for calibration purposes. Selective actuation of reset key 28 provides for establishing this other reference level.

Display 30 is adapted to provide a numeric display of the weight of a parcel placed upon weighing platform 12, the selected destination zone (or ZIP code) for the parcel and the calculated postage for shipping that parcel to the selected destination zone via a selected class of service. Display 30 thus is divided into displays 32, 34 and 36 corresponding to weight, zone and postage, respectively, each comprising a plurality of selectively energizable elements, such as the so-called 7-segment display. Each display element is capable of providing a visual indication of a decimal point. Weight display elements 32 are divided into pounds, ounces and one-half ounce elements, the pounds elements being provided with units and tens digits and capable of displaying 0 to 99 pounds, the ounce display elements including units and tens elements for displaying 0 to 15 ounces, and the one-half ounce element including a single element for selectively displaying 0.0 or 0.5 ounces. Zone display elements 34 include three elements for selectively displaying either the first three digits of a destination ZIP code or the zone (L, 1 to 8) corresponding to the destination address. Postage display elements 36 include a two-digit dollars display (0 to 99) and a two-digit cents display (0 to 99).

The operation of the illustrated apparatus will be described in conjunction with a typical postage calculation. Initially, power supply switch 18 is activated to supply operating voltage and current to postal scale electronics 10. Prior to placing an object upon weighing platform 12, reset key 28 is operated so as to establish a reference weighing level (hereinafter sometimes designated the zero-weight level). When the object is placed upon weighing platform 12, load cell 14 produces a signal corresponding to the weight of the object, and this signal is transmitted via cable 16 to postal scale electronics 10. The weight-indication signal produced by load cell 14 is suitably converted to appropriate digital data, and this data drives weight display elements 32 so as to provide a visual indication of the weight of the object.

Assuming that the object is a parcel to be shipped, class-of-service keys 22 are selectively operated so as to establish a desired class of shipment. Then, the destination zone of the parcel is keyed into postal scale electronics 10 by the selective operation of one of numeric keys 24. The selected destination zone also is displayed by zone display elements 34. In the event that the destination zone is not known, but the operator is aware of the destination ZIP code, ZIP code key ZIP is operated and numeric keys 24 are activated to provide the first three digits of the destination ZIP code. These digits are displayed by zone display elements 34 and a further display of the comparable zone is provided. This zone then must be keyed into the scale electronics, as above. Based upon the parcel weight (displayed by weight display elements 32), the selected class of service (corresponding to the actuated class-of-service key 22) and the keyed-in destination zone (displayed by zone display elements 34), postal scale electronics 10 calculates the correct postage, and this postage is displayed by postage display elements 36. If a special service fee is to be added to the postage, a selected special service key 26 is operated, together with appropriate numeric keys 24, so as to key in the special service fee, which fee is displayed by, for example, postage display elements 36. Then, if addition key ADD is actuated, the special service fee is added to the calculated postage and this total postage is displayed by postage display elements 36.

Figure 2:
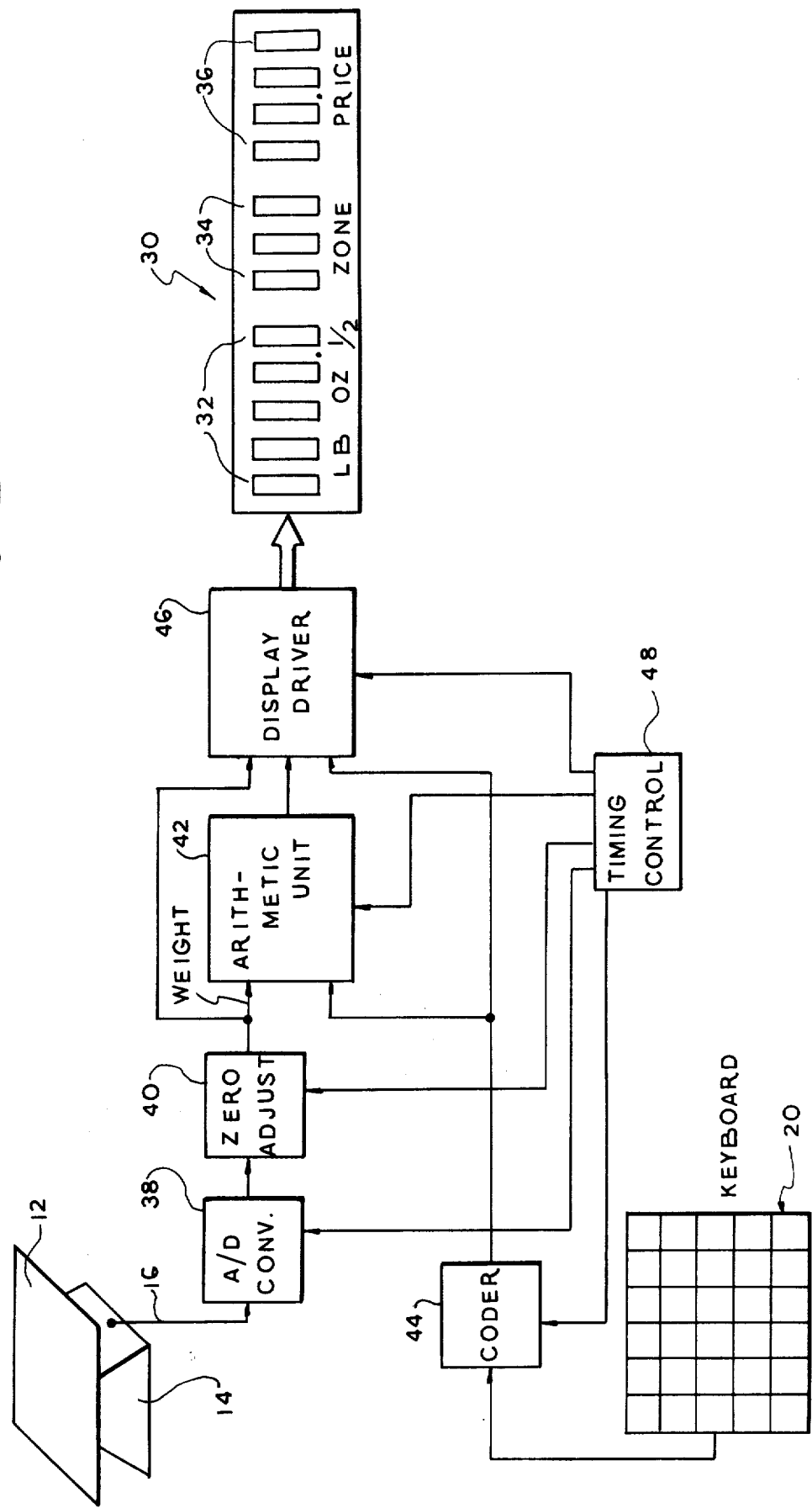
FIG. 2 is a functional block diagram of the electronics included in the postage scale.

Turning now to FIG. 2, a functional block diagram of postal scale electronics 10 is shown as comprising analog-to-digital converter 38, a zero adjust unit 40, an arithmetic unit 42, a keyboard encoder 44, a display driver 46 and a timing control generator 48. Analog-to-digital converter 38 is coupled to cable 16 and is adapted to receive the analog weight-indication signal generated by load cell 14. The analog-to-digital converter is adapted to convert the analog weight-indication signal to a corresponding digital code. As an example, the weight-indication signal exhibits a range of from 0 to 100 pounds, and a resolution of 1/16 or 1/64 ounces. Analog-to-digital converter 38 is capable of providing over 28,500 different codes. This would require a 15-bit word ($2^{15}=32,768$) for a corresponding BCD representation of the weight-indication signal. However, in a preferred embodiment, analog-to-digital converter 38 provides a multiplexed 4-bit word with each word in the multiplexed signal representing, for example, a digit of weight. Such an analog-to-digital converter may include, for example, a Model LD 120, manufactured by Siliconix, Inc. of Santa Clara, California. Thus, the output of analog-to-digital converter 38 is a multiplexed five decimal digit BCD signal. This multiplexed signal is referred to herein as a digital weight signal, and a respective digital weight signal is produced as a digitized representation of each time-sample of the analog weight-indication signal produced at the output of the load cell.

Analog-to-digital converter 38 also includes the so-called dual slope converter. Such a dual slope converter is manufactured by Intersil, Inc., of Delaware, as Model 7103A. In its operation, a dual slope converter intergrates an input analog signal over a predetermined period of time, the converter including a counter circuit for counting pulses during this integration period. After integrating the analog signal, a reference signal of opposite polarity and predetermined voltage is integrated to return the output of the integrator to its initial value. Timing pulses again are counted during this second integration period, and the number of such pulses which are counted is directly proportional to the original input analog signal. These counted timing pulses then are converted to the aforementioned multiplexed 4-bit BCD code representing pounds, ounces and one-half ounces. This code, or weight data, is supplied to display driver 46 for display by weight display elements 32, as mentioned previously. The weight data also is supplied to arithmetic unit 42.

The various key elements of keyboard 20 can be considered to be arranged in a matrix array. Hence, when one or more key elements are actuated, a corresponding encoded representation of such key elements can be generated. Keyboard encoder 44 is coupled to keyboard 20 and is adapted to generate such encoded representations. A preferred embodiment of the keyboard encoder is described in greater detail in aforementioned application Ser. No. 816,724. For the purpose of the present discussion, it may be noted that keyboard encoder 44 includes a scanning circuit to scan each key element included in the matrix array and to detect when a particular scanned element is actuated. A corresponnding encoded signal then is generated in response to a detected actuated key element. This encoded keyboard data is supplied by keyboard encoder 44 to display driver 46, the latter driving display 30 to provide a suitable visual indication of the selectively actuated keyboard. For example, keyboard encoder 44 will provide data corresponding to the selected destination zone, which data is displayed by zone display elements 34.

The encoded keyboard data also is applied to arithmetic unit 42. The arithmetic unit includes a storage device, such as a memory unit, wherein weight rate data is stored for each destination zone included in each selectable class of service, this weight rate data representing the postage rate per unit of weight. As an example, such a memory unit will store data representing the postage per ounce for first class mail, the postage per pound for each zone for parcel post, etc. Depending upon the encoded keyboard data generated by keyboard encoder 44, the corresponding weight rate data is read out of the memory unit of arithmetic unit 42. The arithmetic unit also includes a multiplier, such as a binary multiplier, supplied with the encoded weight data and the weight rate data read out of the aforementioned memory unit, to multiply the respective data signals for producing a postage data signal representing at least a portion of the postage required for shipping the parcel placed upon weighing platform 12 to the selected destination via the selected class of service. As will be described below, the memory unit for storing the weight rate data also may store the package rate data, that is, the base postage required for sending a parcel of minimum weight to the selected destination zone via the selected class of service. Arithmetic unit 42 may further include an adder circuit for adding this package rate data to the calculated postage data, resulting in a total postage data signal. This total postage data signal is supplied to display driver 46 which, in turn, drives postage display elements 36 to provide a visual indication of the total postage data.

As shown, timing control generator 48 is coupled to each of analog-to-digital converter 38, zero adjust unit 40, arithmetic unit 42, keyboard encoder 44 and display driver 46 so as to synchronize the operations of these respective circuits. Accordingly, timing control generator 48 may include a reference oscillator, preferably of a high oscillating frequency, such as a crystal oscillator, this oscillator being coupled to a counting circuit and various gating circuits for generating recurrent timing pulses to be supplied to the illustrated circuits. The respective timing pulses need not be of the same frequency; and are adapted to provide timing pulses of suitable frequencies to the illustrated circuits. For example, the timing pulses applied to analog-to-digital converter 38 are adapted to sample the analog signal applied thereto, and to provide appropriate multiplexing clock signals for generating the BCD digital weight signal for each time-sample. As another sample, the timing pulses applied to zero adjust unit 40 are adapted to synchronize the rate at which the zero adjustment is made with the sampling rate at which the analog weight data is sampled.

Figure 3:
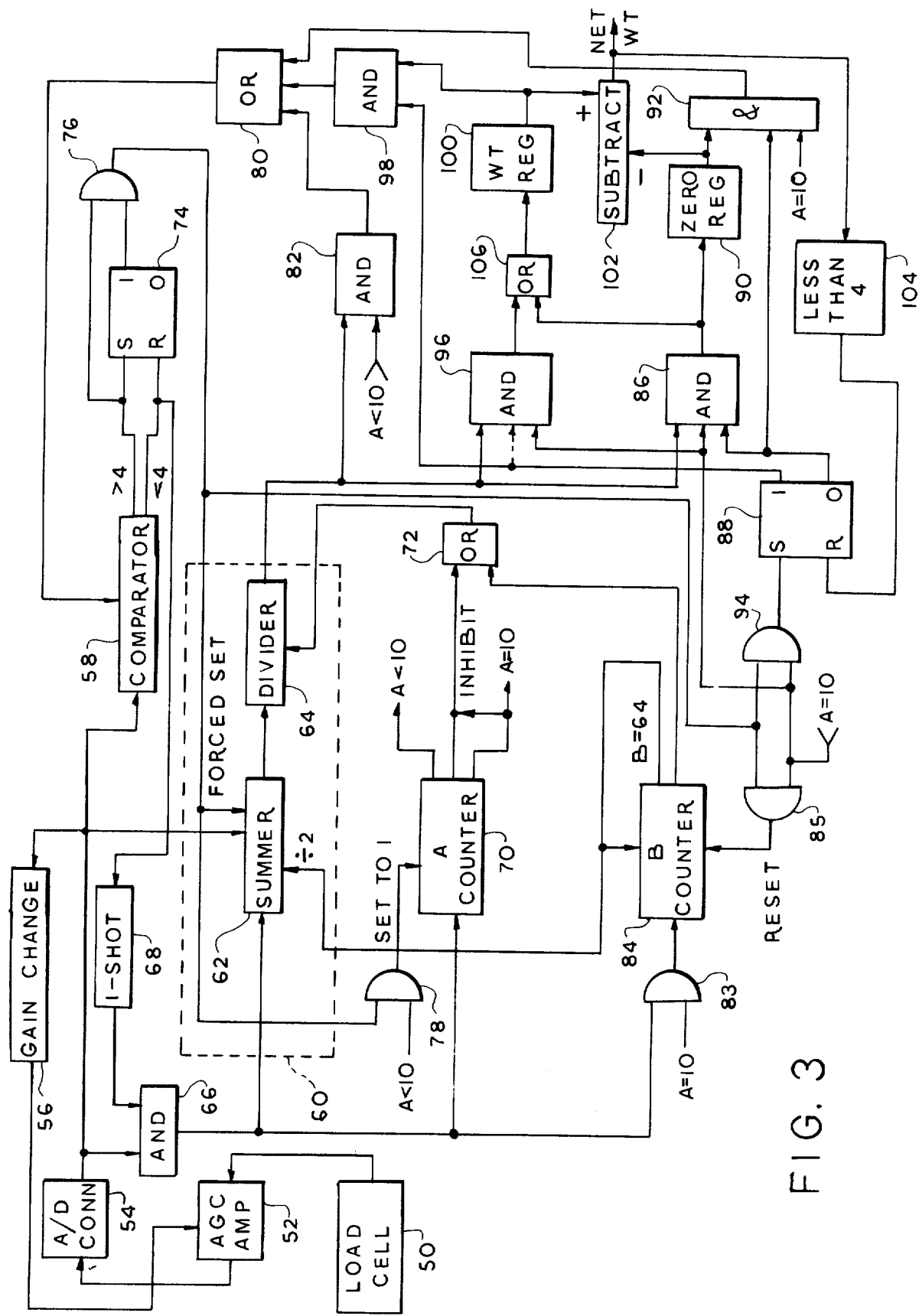
FIG. 3 is a functional block diagram of the apparatus for carrying out the initializing operation, zero-adjustment operation and weighing operation in accordance with the present invention.

Turning now to FIG. 3, there is illustrated a functional block diagram of one embodiment of the present invention, which embodiment includes zero adjust unit 40, or, more particularly, apparatus for carrying out the zero-adjustment operation, as well as apparatus for carrying out the initializing operation and the weighing operation. This functional block diagram represents logic circuits which are known to those of ordinary skill in the art and which can be connected in accordance with the present teachings to constitute an operable embodiment of the present invention. The illustrated functional block diagram also can be implemented by a micro-processor, such as a Model 8080 manufactured by Intel Corporation, or equivalent device, which is programmed by one of ordinary skill in the art to perform the functions described below. It should be fully understood that, although the present invention is described in the environment of a postage scale, it can be used with weighing apparatus, or scales, in general, and need not be limited solely to postage scales.

The embodiment of FIG. 3 is comprised of load cell 50, an automatic gain controlled (AGC) amplifier 52, analog-to-digital (A/D) converter 54, gain changing circuit 56 and a logic circuit, or unit, which functions to perform the initializing, zero-adjustment and weighing operations, to be described. Load cell 50 is of the type described above and is used in conjunction with a weighing platform to receive an object to be weighed. The analog output signal produced by load cell 50 may be subjected to amplitude fluctuations attributed to temperature, age of the load cell and other factors which disturb the weight indication provided by the load cell output signal. One of the aspects of the present invention is to provide an accurate measure of the weight of an object notwithstanding such amplitude fluctuations. The output of load cell 50 is coupled to A/D converter 54 by AGC amplifier 52. Preferably, AGC amplifier 52 exhibits two different levels of gain. If the weight of an object is less than some predetermined amount, that is, if the level of the output signal produced by load cell 50 is less than some predetermined level, then AGC amplifier 52 is provided with a relatively high gain. However, if the weight of the object exceeds this predetermined amount, that is, if the output signal level produced by the load cell exceeds the predetermined level, the gain of the AGC amplifier is reduced, for example, to one-half the aforementioned gain. Thus, the resolution for low level signals is improved. As an example, for lower weight signals, the least significant bit of the digital signal produced by A/D converter 54 may represent 1/64 ounces, whereas for higher weight signals, the least significant bit of the digital signal may represent 1/16 ounces.

In order to effect the aforementioned gain-changing feature, the output of A/D converter 54 is coupled to gain changing circuit 56, the output of this gain changing circuit being supplied to the gain controlling input of AGC amplifier 52. The gain changing circuit includes detecting circuitry adapted to detect when the digital weight signal produced by A/D converter 54 exceeds some pre-established digital level. When this digital level is exceeded, the gain changing circuit supplies a gain-reducing control signal to the AGC amplifier to correspondingly reduce the gain of the latter. In the event that the digital weight signal produced by A/D converter 54 falls below this pre-established level, gain changing circuit 56 detects this condition to supply a gain-increasing control signal to AGC amplifier 52. If desired, this gain-changing feature may be omitted, thereby obviating gain changing circuit 56.

Preferably, A/D converter 54 includes the aforementioned dual slope converter and BCD multiplexor. Of course, other conventional analog-to-digital converters can be used to produce successive digital weight signals corresponding to time-samples of the output signal provided by load cell 50. Hence, in response to each sampling pulse produced by, for example, timing control unit 48 (FIG. 2), a corresponding digitized version of the load cell output signal is produced, this digitized version constituting a digital weight signal. Since, in the preferred embodiment, sampling pulses are produced periodically and continuously, A/D converter 54 provides successive digital weight signals on a continuing basis. The output of A/D converter 54 is coupled to a comparator 58 and a circuit 60 for obtaining a statistically accurate approximation of actual weight. In the embodiment shown in FIG. 3, the comparator and circuit 60 are included in circuits which are used to carry out the initializing, zero-adjustment and weighing operations, respectively. It will be understood that in the embodiment wherein these operations are carried out by a micro-processor, the comparator and circuit 60 are included in respective units of the micro-processor which function to perform such operations. For the purpose of the present discussion, it will be assumed that initializing, zero-adjustment and weighing circuitry are provided. The initializing circuitry includes a counter 70, referred to herein as the A counter. The zero-adjustment circuitry includes a counter 84, referred to herein as the B counter, and a zero storage register 90. The weighing circuitry also includes B counter 84 and also a weight storage register 100, a subtracting circuit 102 and a detecting circuit 104.

Circuit 60 is adapted to use the digital weight signals produced by A/D converter 54 to obtain a statistical approximation of the actual weight of the object, referred to herein as the weight-representing signal. Circuit 60 includes a summing circuit 62 connected via an AND gate circuit 66 to the output of the A/D converter for arithmetically summing the successive digital weight signals which are supplied thereto. A dividing circuit 64 is coupled to the output of summing circuit 62 and serves to divide the summed digital weight signals by the number of such digital weight signals which are included in that sum. The output of divider 64 thus is a representation of the statistical approximation of the actual weight signal and is referred to as the weight-representing signal. This weight-representing signal is for all practical purposes a representation of the true weight on load cell 50.

AND gate circuit 66 may be comprised of a plurality of AND gates, each being connected to receive a respective bit of the digital weight signal produced by A/D converter 54. The combination of such AND gates is represented by the illustrated AND gate circuit. The digital weight signal produced by A/D converter 54 is transmitted, or gated, by AND gate circuit 66 in response to a gating signal supplied thereto, it being understood that this gating signal is supplied in common to all of the individual AND gates which constitute AND gate circuit 66. The gating signal is supplied to the AND gate circuit by a pulse generator, such as one-shot circuit 68. This one-shot circuit is coupled to an output of comparator 58 and operates to produce a pulse gating signal in a manner described hereinbelow.

The output of AND gate circuit 66, in addition to being coupled to summing circuit 62, is coupled to A counter 70. The purpose of A counter 70 is to count the number of digital weight signals which are supplied to the summing circuit. Thus, whenever AND gate circuit 66 gates a digital weight signal to the summing circuit, the count of A counter 70 is incremented. The count of the A counter is supplied to dividing circuit 64 by an OR circuit 72. Thus, the summed digital weight signals included in summing circuit 62 are divided in dividing circuit 64 by the count then existing in A counter 70, this count being equal to the number of digital weight signals which are included in the sum provided by the summing circuit.

The weight-representing signal produced by circuit 60, that is, the output digital signal produced by dividing circuit 64, is supplied through an AND gate circuit 82 and an OR circuit 80 to another input of comparator 58. AND gate circuit 82 may be similar to AND gate circuit 66 and is adapted to receive a gating signal from A counter 70 when the count of this counter is less than some predetermined count. As a numerical example, if the count of A counter 70 is less than 10, then a gating signal is supplied to AND gate circuit 82. This gating signal may be produced by the A counter, such as by a suitable gating circuit connected to produce a binary "1" when the count of the A counter is less than 10, and to produce a binary "0" when the count thereof is equal to or greater than 10.

OR circuit 80 may be comprised of a plurality of OR gates, each OR gate being supplied with a respective bit included in the digital weight-representing signal produced by circuit 60, and also with a respective bit included in the digital signal stored in zero storage register 90, and also a respective bit included in the digital signal stored in weight storage register 100, to be described. That is, the output of OR circuit 80 is a multi-bit digital signal which represents either the weight-representing signal produced by circuit 60 or the zero-weight signal stored in zero storage register 90 or the gross weight signal stored in weight storage register 100. The weight signal produced by OR circuit 80 is supplied to comparator 58 whereat it is compared with the digital weight signal produced by A/D converter 54. The comparator is adapted to detect whether the digital weight signal supplied therefrom from the A/D converter is within a predetermined range of the signal which is supplied thereto by OR circuit 80. It will soon be seen that the signal which is provided at the output of OR circuit 80 is a weight-representing signal. Thus, comparator 58 functions to determine whether the difference, if any, between the digital weight signal and the weight-representing signal is within a predetermined range. As a numerical example, this range is equal to four counts. If the least significant bit of the digital weight signal produced by A/D converter 54 has a resolution corresponding to 1/64 ounces, then comparator 58 functions to determine whether the digital weight signal is within 4/64, or 1/16 ounces of the weight-representing signal. If the least significant bit of the digital weight signal has a resolution equal to 1/16 ounces, then comparator 58 functions to determine whether the digital weight signal is within 4/16, or 1/4 ounces of the weight-representing signal. The comparator is provided with two output terminals, one of which is coupled to one-shot circuit 68. This one output terminal is provided with a pulse in the event that the digital weight signal is within the predetermined range (e.g. four counts) of the weight-representing signal. Thus, if the digital weight signal is within the predetermined range of the weight-representing signal, one-shot circuit 68 is energized to supply the gating signal to AND gate circuit 66. This one output of comparator 58 additionally is connected to the reset input R of a set-reset (referred to as an R-S) flip-flop circuit 74. The other output of comparator 58 is connected to the set input S of R-S flip-flop circuit 74. Thus, if the digital weight signal is outside the predetermined range of the weight-representing signal, comparator 58 supplies a pulse to the set input S of R-S flip-flop circuit 74. The setting of flip-flop circuit 74 results in a binary "1" at the 1 output thereof. This binary "1" is used as a flag signal. It is appreciated that if the flip-flop circuit is set so as to produce this flag signal, the subsequent resetting thereof, as when the digital weight signal produced by A/D converter 54 is within the predetermined range of the weight-representing signal, clears this flag signal.

An AND gate 76 is provided to detect whether two successive digital weight signals are outside the predetermined range of the weight-representing signal. AND gate 76 includes one input connected to the 1 output of R-S flip-flop circuit 74 and another input connected to the output of comparator 58 which is coupled to the set input S of the flip-flop circuit. Thus, if the flag signal is present, that is, if flip-flop circuit 74 had been set, and if comparator 58 produces a pulse representing that the latest digital weight signal applied thereto from A/D converter 54 is outside the predetermined range of the weight-representing signal, AND gate 76 produces an output pulse.

The output of AND gate 76 is connected to a forced set gating input of summing circuit 62 and also to an input of an AND gate 78. In addition, this output of AND gate 76 is connected to respective inputs of AND gates 85 and 94. Summing circuit 62 additionally includes a forced set data input connected to the output of A/D converter 54. In response to the output pulse produced by AND gate 76 and supplied to its forced set gating input, summing circuit 62 replaces the contents thereof, that is, the sum of the digital weight signals which have been supplied thereto, with the digital weight signal then being supplied to its forced set data input. As an example, summing circuit 62 may include a storage register in which the sum of the digital weight signal is stored. This storage register may include input terminals corresponding to the forced set gating and data inputs for replacing the contents of the storage register with the digital weight signal then produced by the A/D converter in response to the output pulse produced by AND gate 76.

As mentioned above, and as shown in FIG. 3, the output of AND gate 76 is connected to one input of AND gate 78. The other input of AND gate 78 is supplied with a gating signal produced by A counter 70 when the count thereof is less than the above-mentioned predetermined count (e.g. less than a count of 10). For the purpose of the present discussion, this gating signal is referred to as the $A<10$ signal. The output of AND gate 78 is connected to a preset input of the A counter, whereby the count of this counter is preset to a count of 1. Thus, in response to the output pulse produced by AND gate 76, it is seen that the sum of the digital weight signals included in summing circuit 62 is replaced with the digital weight signal then produced by A/C converter 54, and also, the count of A counter 70 is preset to a count of 1, provided that the A counter had not reached a count of 10. As a consequence thereof, the weight-representing signal now produced by circuit 60 is equal to the digital weight signal then produced by the A/D converter. That is, this digital weight signal is averaged with itself. It is this new weight-representing signal which is supplied through AND gate circuit 82 and OR circuit 80 to comparator 58 for comparison with the next succeeding digital weight signal.

In the event that A counter 70 is not preset to a count of 1, the count thereof eventually will reach a count of 10 ($A=10$). A corresponding output signal, referred to as the $A=10$ output signal is produced and is supplied as a gating signal to each of AND gates 83, 85 and 94, and also to each of AND gate circuits 86 and 92, for a purpose to be described. This $A=10$ signal optionally may be used to reset the A counter to an initial count, such as zero. AND gate 83 includes another input connected to the output of AND gate circuit 66, and an output connected to B counter 84. Whenever AND gate 83 is enabled by the $A=10$ gating signal, the updating of the weight-representing signal produced by circuit 60, as by gating the latest digital weight signal produced by A/D converter 54 to summing circuit 62, results in incrementing the count of the B counter. The B counter is adapted to count to a predetermined number, such as 64, at which time the B counter produces an output signal B=64 representative thereof. This output signal is applied to a preset input of the B counter and serves to preset the count thereof to a lower count, for example, a count of 32. At the same time, this B=64 output signal is supplied to summing circuit 62 whereat it is used to divide the sum of the digital weight signals accumulated therein by a factor of two. Hence, it is seen that this modification in the count of B counter 84 is accompanied by a compensating modification in the sum of the digital weight signals, resulting in substantially no change in the weight-representing signal produced at the output of dividing circuit 64 of circuit 60.

The count of B counter 84 is supplied to the dividing circuit via OR circuit 72. When the A counter reaches a count of 10 (A=10), the weight-representing signal thereafter is determined on the basis of the count of B counter 84, as will be described. The B counter includes a reset input connected to the output of AND gate 85 for receiving a reset signal in the event that AND gate 76 produces an output pulse and AND gate 85 is enabled by the A=10 gating signal. This reset pulse resets B counter 84 to an initial count, such as a count of one.

As shown in FIG. 3, the weight-representing signal produced at the output of circuit 60 is supplied to AND gate circuit 86. This AND gate circuit includes another input to receive the A=10 gating signal, and yet another input connected to the 0 output of an R-S flip-flop circuit 88. The output of AND gate circuit 86 is connected to zero storage register 90 and also, via an OR circuit 106, to weight storage register 100, and serves to supply the weight-representing signal to these storage registers once A counter 70 attains a count of 10, and provided R-S flip-flop circuit 88 admits of its reset state. As the weight-representing signal changes in response to t he updating thereof by the successive digital weight signals produced by A/D converter 54, the contents of zero storage register 90 and weight storage register 100 change in a similar manner. The contents of the zero storage register are supplied via AND gate circuit 92 and OR circuit 80 to comparator 58 whereat they are compared to each successive digital weight signal. It is seen that AND gate circuit 92 is enabled by the A=10 gating signal and by the reset state of R-S flip-flop circuit 88.

The set input S of R-S flip-flop circuit 88 is connected to the output of AND gate 94. This AND gate receives the A=10 gating signal as well as the output pulse produced by AND gate 76. Hence, it may be appreciated that flip-flop circuit 88 is set once A counter 70 has attained a count of 10 and, thereafter, comparator 58 detects that two successive digital weight signals are outside the range of the weight-representing signal then stored in storage register 90. The 1 output of R-S flip-flop circuit 88 is connected to one input of an AND gate circuit 98 and to an input of an AND gate circuit 96. Another input of AND gate circuit 96 is used as an enabling input and is connected to receive the A=10 gating signal produced by A counter 70. A further input of AND gate circuit 96 is connected to the output of circuit 60 for receiving the weight-representing signal therefrom. The output of this AND gate circuit is connected to weight storage register 100 via OR circuit 106 and serves to supply the weight-representing signal to this weight storage register when enabled by the A=10 gating signal and by the set state of flip-flop circuit 88. The contents of weight storage register 100 are supplied via AND gate circuit 98 and OR circuit 80 to comparator 58 whereat they are compared to each successive digital weight signal produced by A/D converter 54.

Subtracting circuit 102 includes one input connected to zero storage register 90 and another input connected to weight storage register 100. The subtracting circuit is adapted to subtract the contents of the zero storage register, that is, the zero-weight level, from the contents of the weight storage register. Hence, the output of subtracting circuit 102 is a digital signal representing the net weight of the object placed upon load cell 50. The output of subtracting circuit 102 is utilized by arithmetic unit 42 shown in FIG. 2. In addition, the output of subtracting circuit 102 is connected to detecting circuit 104. This detecting circuit is adapted to detect when the net weight signal is approximately zero. As a numerical example, if the output of subtracting circuit 102 is a digital signal corresponding to four digital counts (e.g. a net weight of 1/16 or 1/4 ounces, depending upon the gain of AGC amplifier 52), or less, detecting circuit 104 produces a reset signal which is supplied to the reset input R of flip-flop circuit 88.

The operation of the apparatus represented by the functional block diagram illustrated in FIG. 3 now will be described with reference to the respective initializing, zero-adjustment and weighing operations performed thereby.

Initializing Operation

The initializing operation is intended to determine when a zero-weight level (i.e., no weight placed upon the weighing platform) first is produced or to establish a tare weight. More particularly, the initializing operation is carried out when the electronic scale first is turned on, that is, when power supply switch 18 is operated, or when a zero-reset mode is selected by the actuation of reset key 28 (FIG. 1). The latter mode will establish a tare weight if the object to be tared out is on the platform when the reset key is actuated. Although not shown in FIG. 3, an OR gate, or equivalent, may be provided so as to detect when switch 18 or reset key 28 is actuated so as to produce a system reset signal. This reset signal is supplied to summing circuit 62, to A counter 70, to B counter 84, to zero storage register 90 and to weight storage register 100. The effect of this reset signal is to clear each of these elements and to reset same to their respective initial conditions. As an example, the contents of summing circuit 62 and the respective storage registers may be reset to zero. Counters 70 and 84 likewise may be reset to zero. As a result thereof, the A<10 gating signal is produced by A counter 70. This means that AND gates 83, 85 and 94, together with AND gate circuits 86, 96 and 92 all are disabled. At the same time, flip-flop circuit 88 is reset. The resetting of this flip-flop circuit may be attained either by the system reset signal or by the fact that, since zero storage register 90 and weight storage register 100 both are reset to zero, the output of subtracting circuit 102 will be a digital signal corresponding to less than four counts, whereby detecting circuit 104 serves to reset this flip-flop circuit.

A/D converter 54 provides successive digital weight signals corresponding to successive time-samples of the output signal produced by load cell 50. If it is assumed that, since the contents of summing circuit 62 had been cleared to zero, the weight-representing signal provided by circuit 60 likewise is equal to zero, this weight-representing signal is supplied through AND gate circuit 82, enabled by the A < 10 gating signal and OR circuit 80 to comparator 58. It is expected that the first digital weight signal produced by A/D converter 54, which represents the no-load weight upon load cell 50, differs from this weight-representing signal by more than the aforementioned predetermined range. Hence, comparator 58 produces a pulse which sets flip-flop circuit 74. One-shot circuit 68 is not energized and, therefore, AND gate circuit 66 is inhibited from gating or transmitting the digital weight signal produced by A/D converter 54. The next digital weight signal likewise will differ from the weight-representing signal, resulting in another pulse produced by comparator 58 and supplied to AND gate 76. This AND gate is enabled by the flag signal produced as a result of the previous setting of flip-flop circuit 74. Hence, AND gate 76 supplies an output pulse to the forced set gating input of summing circuit 62. Therefore, the digital weight signal now produced by A/D converter 54 and supplied to the forced set data input of the summing circuit is entered therein. Also, the output pulse produced by AND gate 76 is supplied through enabled AND gate 78 to the preset input of A counter 70, thereby setting the count of this counter to a count of 1. The weight-representing signal now produced by circuit 60 is seen to be equal to the average of the digital weight signal which is produced by A/D converter 54.

The next digital weight signal produced by the A/D converter is supplied to comparator 58 whereat it is compared with the weight-representing signal provided by circuit 60 and supplied to the comparator by AND gate circuit 82 and OR circuit 80. If this latest digital weight signal is within the predetermined range of the weight-representing signal provided by circuit 60, that is, if this latest digital weight signal differs from the weight-representing signal by less than four counts, then comparator 58 supplies a pulse to the reset input R of flip-flop circuit 74, thereby resetting this flip-flop circuit, and also supplies a pulse to one-shot circuit 68, thereby energizing this one-shot circuit. The resetting of flip-flop circuit 74 disables AND gate 76. The energization of one-shot circuit 68 results in a gating signal supplied thereby to AND gate circuit 66, thereby enabling the AND gate circuit to gate, or transmit, the digital weight signal produced at the output of A/D converter 54 to summing circuit 62. Hence, this digital weight signal is added to the contents of the summing circuit (which has been assumed to be equal to the previously supplied digital weight signal). Also, the count of A counter 70 is incremented by reason of this gating of the digital weight signal to summing circuit 62. The count of the A counter thus is equal to the number of digital weight signals which are included in the sum of digital weight signals calculated by summing circuit 62. This count is supplied through OR circuit 72 to dividing circuit 64 for dividing this sum by such count. As a consequence thereof, the output of the dividing circuit, that is, the output of circuit 60, is seen to be equal to an updated average weight signal.

When A/D converter 54 produces the next digital weight signal, corresponding to the next time-sample of the output signal produced by load cell 50, this latest digital weight signal is compared in comparator 58 with the previously updated weight-representing signal which is supplied to the comparator from circuit 60 via AND gate circuit 82 and OR circuit 80, as mentioned above. If this latest digital weight signal is within the predetermined range (e.g. within four counts) of the weight-representing signal, this latest digital weight signal is used to update the weight-representing signal. That is, this latest digital weight signal is summed with the contents of summing circuit 62, and the count of A counter 70 is incremented, whereby dividing circuit 64 divides the updated sum of digital weight signals with this incremented count. However, if this latest digital weight signal is outside the predetermined range of the weight-representing signal, then comparator 58 supplies a pulse to the set input S of flip-flop circuit 74. This flip-flop circuit, when in its set state, produces the flag signal at its 1 output. Also, since comparator 58 supplies a pulse to the set input of flip-flop circuit 74 and not to one-shot circuit 68, the one-shot circuit is not energized and, hence, does not supply a gating signal to AND gate circuit 66. Therefore, the latest digital weight signal produced at the output of the A/D converter, which has been assumed to be outside the predetermined range of the weight-representing signal, is not gated by AND gate circuit 66 to circuit 60 and, consequently, is not used to update the weight-representing signal. If the next-following digital weight signal produced by A/D converter 54 also is outside the predetermined range of the weight-representing signal, comparator 58 once again supplies a pulse to the set input S of flip-flop circuit 74. This pulse also is supplied to AND gate 76, which had been enabled by the flag signal produced by the flip-flop circuit. Accordingly, AND gate 76 now responds to the pulse supplied thereto by the comparator to produce an output pulse which is applied to the forced set gating input of summing circuit 62 and also to AND gate 78. This output pulse clears the contents of summing circuit 62 to replace such contents with this next-following digital weight signal which is applied to the forced set data input of the summing circuit. This output pulse produced by AND gate 76 is supplied through AND gate 78, which is enabled by reason of the fact that the count of A counter 70 is less than 10, that is, this AND gate is enabled by the A < 10 gating signal, so as to reset the A counter to a count of 1. Dividing circuit 64 divides the contents of summing circuit 62, which is seen to be equal to this next-following digital wave signal, by the count of A counter 70, which is seen to be a count of 1, to produce a new weight-representing signal. This new weight-representing signal is the next-following digital weight signal effectively averaged with itself. This new weight-representing signal is supplied through AND gate circuit 82 and OR circuit 80 to comparator 58 whereat it is compared with subsequent digital weight signals.

In view of the foregoing discussion, it is appreciated that, if two successive digital weight signals produced by A/D converter 54 are outside the predetermined range of the weight-representing signal which is produced by circuit 60, this weight-representing signal is replaced with a new weight-representing signal, the latter being equal to the latest digital weight signal averaged with itself. However, if one digital weight signal is outside the predetermined range of the weight-representing signal, resulting in the setting of flip-flop circuit 74 to produce the flag signal, but the next-following digital weight signal is within the predetermined range, then the flip-flop circuit is reset so as to clear, or terminate the flag signal, and this next-following digital weight signal is used to update the weight-representing signal. Once A counter 70 attains a predetermined count, such as a count of 10, representing that ten digital weight signals have been produced, all of which are within the predetermined range of the weight-representing signal, the A counter produces the aforementioned A = 10 gating signal. This A = 10 gating signal represents that the weight-representing signal now produced by circuit 60 corresponds to a true statistical approximation of the actual zero-weight signal. Thus, this weight-representing signal, which now represents the zero-weight signal, is gated through AND gate circuit 86, which is enabled by the A = 10 gating signal, to zero storage register 90. It is appreciated that the weight-representing signal is not considered to be equal to the true zero-weight signal until this statistical approximation has been produced from ten digital weight signals. This is to permit various transients and modifications in the output signal produced by load cell 50 during an initial power turn-on operation or during a zero-reset operation to dissipate before the zero-weight signal is determined.

In the foregoing discussion of the operation of the apparatus illustrated in FIG. 3 during the initializing mode of operation, it has been assumed that the weight-representing signal produced by circuit 60 is replaced by a new weight-representing signal, which is equal to the latest digital weight signal produced by A/D converter 54 averaged with itself, if two successive digital weight signals both are outside the predetermined range of the weight-representing signal. This is to distinguish between spurious weight signals which may differ from the weight-representing signal and steady-state digital weight signals. That is, it is assumed that if the steady-state digital weight signal has changed, for example, because of temperature dependency, age of the load cell, and other factors, then at least two successive digital weight signals will differ from the weight-representing signal. It is, of course, the intent of the initializing mode to revise the weight-representing signal such that it corresponds to the steady-state no-load, or zero-weight signal. As an alternative to the replacement of the weight-representing signal with a new weight-representing signal if two successive digital weight signals both are outside the predetermined range, an additional counter (not shown) may be provided to count the number of digital weight signals which are found to lie outside this predetermined range. When this additional counter reaches a preselected count, circuit 60 may be cleared so as to produce a new weight-representing signal which is in correspondence with the latest digital weight signal, i.e., with the steady-state digital weight signal. In this alternative, it is not necessary that the additional counter be incremented to the preselected count in response only to successive digital weight signals which are outside the predetermined range. Rather, this additional counter will count the number of all such digital weight signals which are outside the predetermined range.

As another alternative, when the weight-representing signal is replaced by a new weight-representing signal, as when AND gate 76 produces an output pulse, A counter 70 can be forced-set to any desired count n, and the contents of summing circuit 62 can be replaced by the sum of the n latest digital weight signals. The new weight-representing signal produced by circuit 60 will, of course, be equal to the sum of the n latest digital weight signals divided by the count of n.

Zero-Adjustment Operation

In accordance with the aforedescribed numerical example, when A counter 70 is incremented to a count of 10, AND gate circuit 86 is enabled to gate the weight-representing signal produced at the output of circuit 60 into zero storage register 90. Thus, the zero storage register stores an initial, statistical approximation of the true zero-weight level in digital form. The A = 10 gating signal produced by A counter 70 inhibits the count of this counter thereafter from being supplied through OR circuit 72 to dividing circuit 64. Preferably, although not shown herein, when the A counter attains a count of 10, a suitable flip-flop circuit is set to produce the A = 10 gating signal. Then, and as will be described, the count of A counter 70 may be further incremented whenever AND gate circuit 66 gates a digital weight signal to circuit 60 or, alternatively, an AND gate (not shown) may be disabled to prevent the count of the A counter from being incremented further. In either embodiment, the A counter no longer is used to calculate the weight-representing signal; and the count of this counter is not reset until a subsequent initializing, or zero-reset operation is performed.

Circuit 60 is controlled during the zero-adjustment operation in a manner which is substantially the same as the manner in which this circuit is controlled during the initializing operation, described in detail hereinabove. That is, the latest digital weight signal produced by A/D converter 54 is compared in comparator 58 to the weight-representing signal produced by circuit 60. If this latest digital weight signal is within the predetermined range of the weight-representing signal, then the digital weight signal is used to update the weight-representing signal. That is, the digital weight signal is summed with the contents of summing circuit 62, and the resultant sum of the digital weight signals is divided by the number of digital weight signals which are included in that sum. In this regard, B counter 84 is incremented via AND gate 83 (which is enabled by the A = 10 gating signal) each time that the digital weight signal produced by A/D converter 54 is supplied to summing circuit 62. The count of this B counter is supplied to dividing circuit 64 by OR circuit 72. If, by reason of this updating of the weight-representing signal, the count of B counter 84 reaches a predetermined count, for example, a count of 64, this count is preset to a lower, pre-established count, such as a count of 32, and the contents of summing circuit 62, that is, the sum of the digital weight signals which are used to calculate the weight-representing signal, is divided by a factor equal to the ratio of the predetermined count (64) to the pre-established count (32). That is, the contents of summing circuit 62 are divided by a factor of 2. Hence, the weight-representing signal remains substantially unchanged since the sum of the digital weight signal and the count of the number of such digital weight signals included in that sum both are divided by two. If desired, other divisor factors can be used, such as a factor of 4 (wherein the count of B counter 84 is preset down to a count of 16 and the contents of summing circuit 62 are divided by 64/16), a factor of 8 (wherein the count of the B counter is preset to a lower count of 8 and the contents of summing circuit 62 are divided by the factor 64/8), and the like. After B counter 84 has been preset to a lower count and the contents of summing circuit 62 have been divided by the appropriate factor, the foregoing operation for obtaining the statistical approximation of the actual weight is resumed. That is, each digital weight signal produced by A/D converter 54 is compared to the weight-representing signal and, if within the predetermined range thereof, the weight-representing signal is updated with this digital weight signal. It is recognized that, by updating the weight-representing signal, the digital weight signal is summed with the contents of summing circuit 62, and the count of B counter 84 is incremented.

As the weight-representing signal produced by circuit 60 is updated, it also is supplied through AND gate circuit 86 to zero storage register 90. Hence, the contents stored in zero storage registor 90 is equal to the updated, or adjusted, zero weight level. As the output of load cell 50 changes, because of temperature, age, and other factors, the zero weight level is adjusted accordingly, thereby compensating for such changes in the load cell output.

In accordance with the illustrated embodiment, the weight-representing signal which is supplied from circuit 60 through AND gate circuit 86 to zero storage register 90 also is supplied through OR circuit 106 to weight storage register 100. The contents of the zero and weight storage registers are supplied to respective inputs of subtracting circuit 102 which functions to subtract the contents of the zero storage register from the contents of the weight storage register. It is appreciated that, during the zero-adjustment operation, since the same zero weight level is stored in the zero and weight storage registers, the output of subtracting circuit 102, which is equal to the net weight of an object placed upon load cell 50, is equal to zero. This zero net weight is displayed by weight display elements 32 (FIGS. 1 and 2).

Weighing Operation

Let it be assumed that an object is placed upon the load cell. In view of the weight of this object, the level of the output of load cell 50 increases. Accordingly, the digital weight signals produced by A/D converter 54 likewise increase. The first of these digital weight signals is compared in comparator 58 to the weight-representing signal provided by circuit 60 (this weight-representing signal being stored in the zero weight signal in zero storage register 90) in the manner described above. It is appreciated that this digital weight signal will exceed the weight-representing signal by more than the predetermined range. Hence, comparator 58 supplies a pulse to the set input S of flip-flop circuit 74, thereby supplying the flag signal to AND gate 76 from the 1 output of this flip-flop circuit. One-shot circuit 68 is not energized and, therefore, the weight-representing signal provided by circuit 60 is not updated.

The next-following digital weight signal produced by A/D converter 54 likewise will be outside the predetermined range with respect to the weight-representing signal provided by circuit 60. Accordingly, comparator 58 supplies another pulse to the set input S of flip-flop circuit 74, this pulse also being supplied to AND gate 76. The AND gate, which had been enabled by the flag signal previously produced by flip-flop circuit 74, produces an output pulse which is applied to the forced set gating input of summing circuit 62 and, additionally, to AND gates 85 and 94. In the manner described above, the output pulse applied to the forced set gating input of summing circuit 62 serves to replace the contents of the summing circuit with the digital weight signal supplied to the forced set data input thereof by A/D converter 54. Also, the output pulse produced by AND gate 76 is gated by AND gate 85 (which had been enabled by the A=10 gating signal) to reset the count of B counter 84 to a count of one. Therefore, and in a manner analogous to that described with respect to the initializing operation, the weight-representing signal produced by circuit 60 now is a new weight-representing signal which, essentially, is equal to the digital weight signal produced by A/D converter 54 averaged with itself.

The output pulse produced by AND gate 76 also is supplied through AND gate 94 (which had been enabled by the A=10 gating signal) to the set input S of flip-flop circuit 88. This flip-flop circuit is set, thereby removing the binary "1" which had been applied to AND gate circuits 86 and 92 by the 0 output thereof. AND gate 86 now is disabled, and thus is prevented from gating the weight-representing signal from circuit 60 to zero storage register 90. Stated otherwise, when flip-flop circuit 88 is set, the zero weight level stored in the zero storage register is "latched" therein. That is, this zero weight signal is fixed and is prevented from being changed. Also, when AND gate circuit 92 is disabled, the zero weight signal is prevented from being supplied therethrough to comparator 58 for comparison with successive digital weight signals.

When flip-flop circuit 88 is set, AND gate circuit 96 is enabled to gate the weight-representing signal produced by circuit 60 into weight storage register 100. It is recognized that this weight-representing signal now corresponds to the weight of the object which is placed upon the load cell, that is, it is the statistical approximation of the actual weight of the object. Subtracting circuit 102 subtracts the zero weight level stored in zero storage register 90 from this gross weight level stored in weight storage register 100 to produce the digital net weight signal. This net weight signal is displayed by weight display elements 32.

When flip-flop circuit 88 is set, AND gate circuit 98 is enabled to supply the weight-representing level stored in weight storage register 100 through OR circuit 80 to comparator 58 for comparison with the next-following successive digital weight signals produced by A/D converter 54. It is expected that, during a weighing operation, the numerical magnitude of the successive digital weight signals will change toward a steady-state level. Each digital weight signal is compared to the weight-representing level stored in weight storage register 100 to determine whether that digital weight signal is within the predetermined range. If so, the digital weight signal is used to update the weight-representing signal produced by circuit 60, and this updated weight-representing signal is stored as the weight level in weight storage register 100. However, if an incoming digital weight signal is outside the predetermined range with respect to the weight-representing level, comparator 58 sets flip-flop circuit 74 to produce the flag signal. If the next-following digital weight signal also is outside the predetermined range, the weight-representing signal produced by circuit 60 is replaced with a new weight-representing signal (equal to the latest incoming digital weight signal averaged with itself) and this new weight-representing signal is gated into weight storage register 100 by AND gate circuit 96 and stored therein as the new weight level. When the numerical value of the digital weight signal reaches the steady-state level, the weight-representing signal produced by circuit 60 is updated until the predetermined number (e.g. 64) of digital weight signals have been provided. At that time, B counter 84 is preset to its preestablished count (e.g. 32) and the contents of summing circuit 62 are divided by the appropriate ratio (e.g. 64/32). Then, the aforedescribed operation to obtain the statistical approximation of the actual weight is continued whereupon each incoming digital weight signal is used to update the weight-representing signal until B counter 84 once again reaches its predetermined count.

When an object is removed from the load cell, it is appreciated that the level of the output signal produced by load cell 50 decreases. The numerical value of each successive digital weight signal produced by A/D converter 54 correspondingly decreases. When comparator 58 detects that the incoming digital weight signal is outside the predetermined range with respect to the weight-representing signal produced by circuit 60, flip-flop circuit 74 is set to produce the flag signal; and if the next following digital weight signal also is outside the predetermined range, the weight-representing signal is replaced with the new weight-representing signal (equal to the latest incoming digital weight signal averaged with itself). This process continues while the load cell returns to the no-load (or zero-weight) steady-state condition. It is understood that, while the weight-representing signal produced by circuit 60 is changed in this manner, each new weight-representing signal is stored in weight storage register 100. Subtracting circuit 102 continues to subtract the zero weight level stored in zero storage register 90 from the gross weight level stored in weight storage register 100. When the load cell returns to its no-load steady-state condition, the gross weight level stored in weight storage register 100 will be approximately equal to the zero weight level stored in zero storage register 90. Detecting circuit 104 detects when the numerical value of the digital net weight signal produced by subtracting circuit 102 is less than a count of four. When the net weight signal has been reduced to this level, that is, when the gross weight level stored in weight storage register 100 is approximately equal to the zero weight level stored in zero storage register 90, detecting circuit 104 resets flip-flop circuit 88. This enables AND gate circuit 82 so as to "unlatch" the contents of zero storage register 90. Accordingly, the weight-representing signal now produced by circuit 60 is gated through AND gate circuit 86 to zero storage register 90. Hence, the aforementioned zero-adjustment operation automatically is carried out once again after the load cell attains its no-load steady-state condition. The further operation of comparator 58, circuit 60, B counter 84, flip-flop circuit 88, zero storage register 90, weight storage register 100 and subtracting circuit 102 is in the manner described hereinabove with respect to the zero-adjustment operation. Of course, when another object is placed upon the load cell, the illustrated apparatus carries out the aforedescribed weighing operation.

In the embodiment shown and described with reference to FIG. 3, it has been assumed that separate A and B counters are provided. If desired, a single counter can be used, whereby the A<10 gating signal is produced during an initializing operation and the A=10 gating signal is produced when this single counter attains a count of 10. This A=10 gating signal can be used to set an additional flip-flop circuit (not shown) to maintain this A=10 gating signal, while resetting the single counter to an initial count of 1. This single counter then will be used in operation for obtaining the statistical approximation of the actual weight during both the zero-adjustment and weighing operations, in the manner discussed hereinabove with respect to the B counter.

It is appreciated that the contents of summing circuit 62, the counts of counters 70 and 84 (or the equivalent single counter), flip-flop circuits 74 and 88 and storage registers 90 and 100 all will be reset to zero during each initializing operation, such as during power turn-on or when reset switch 28 is actuated. If an additional flip-flop circuit (not shown) is used to maintain the A=10 gating signal, this additional flip-flop circuit likewise is reset at the beginning of each initializing operation.

Micro-Processor Implementation

As mentioned above, the embodiment shown in FIG. 3 can be implemented by conventional logic circuitry corresponding to the respective circuits illustrated therein. As an alternative, the functions performed by such logic circuitry can be carried out by a suitable programmed micro-processor, such as the Model 8080, manufactured by Intel Corp. of California. In the interest of brevity, the detailed program for such a micro-processor is not provided herein. Nevertheless, one of ordinary skill in the art, after understanding the operation of the embodiment illustrated in FIG. 3, will be readily enabled to program the Model 8080 micro-processor, or other micro-processor devices, so as to carry out the aforedescribed initializing, zero-adjustment and weighing operations. A flow chart for such a suitably programmed micro-processor is illustrated in FIG. 4.

Figure 4:
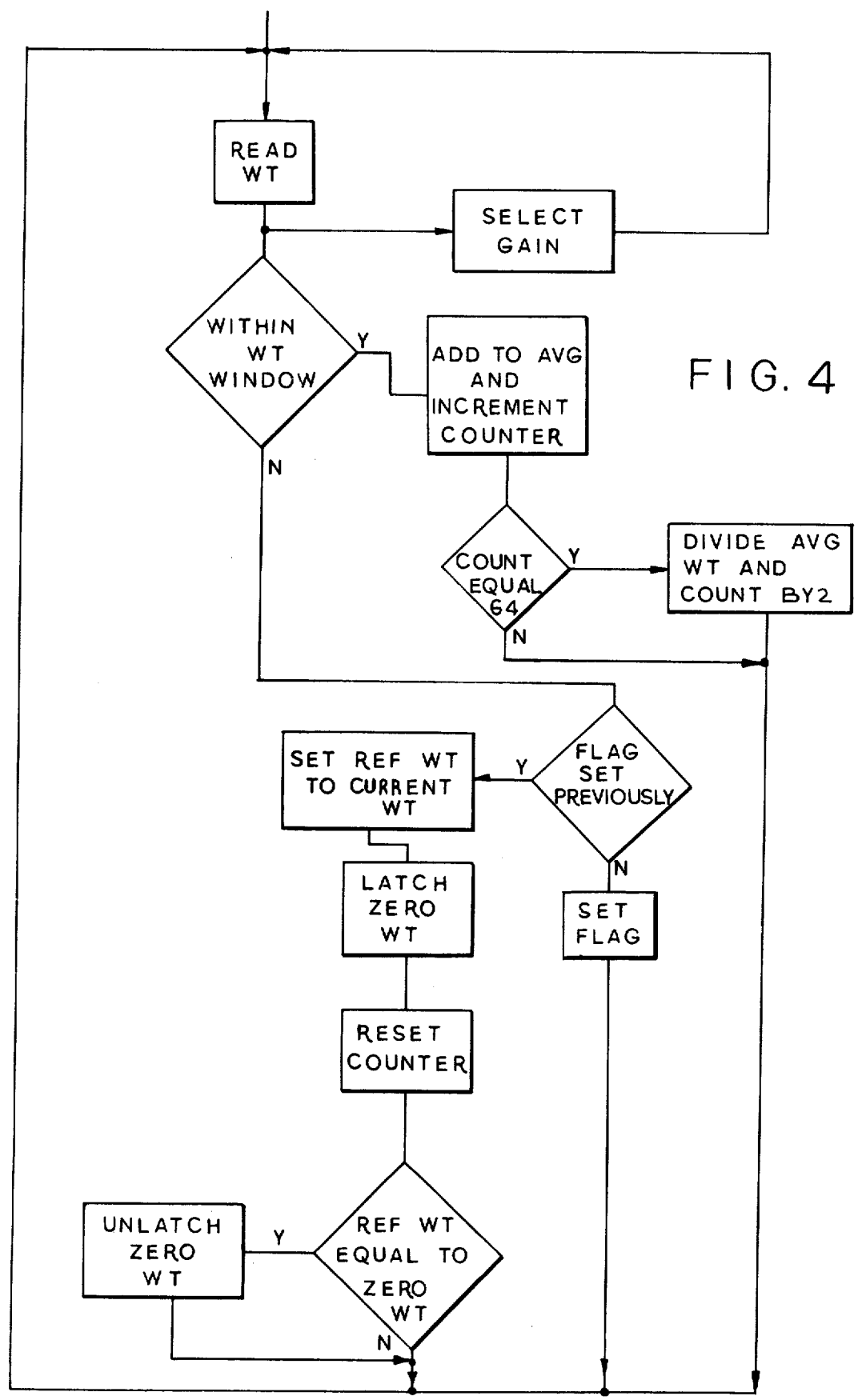
FIG. 4 is a flow chart representing the manner in which the aforementioned initializing, zero-adjustment and weighing operations are carried out by an electronic micro-processor.

Referring to the flow chart shown in FIG. 4, the incoming digital weight signal, such as produced by A/D converter 54 (FIG. 3) is "read", and the numerical value thereof is checked to determine whether the gain of AGC amplifier 52 should be changed. In addition, the digital weight signal is checked to ascertain whether it is within a predetermined weight window. For the purpose of the present discussion, this predetermined weight window is analogous to the predetermined range to which the incoming digital weight signal is compared by comparator 58. If it is determined that the digital weight signal is within the weight window, it is added into the statistically approximated representative weight, and the counter (for example, either A counter 70 or B counter 84) is incremented. If it is assumed that the flow chart illustrated in FIG. 4 corresponds to the zero-adjustment and weighing operations, then, after the counter is incremented, the count thereof is checked to determine whether it is equal to or less than a count of 64. If the count, when incremented, is equal to 64, then the representative weight is divided by 2 and the incremented count likwise is divided by 2 (or reset to a count of 32). If the count, when incremented, is less than a count of 64, neither the representative weight nor the count is modified, and the next digital weight signal is read.

If the digital weight signal which is read is not within the weight window, then an inquiry is made to determine whether the flag (referred to previously as the flag signal) had been set. If the flag had not been set previously, then it is set now; and the next digital weight signal is read. However, if it is determined that the flag has been set in response to the previously read digital weight signal, then the representative weight is set equal to the current weight. This corresponds to replacing the contents of summing circuit 62 (FIG. 3) with the incoming digital weight signal, and by resetting B counter 84 to a count of 1. In addition to setting the representative weight to the current weight, the zero weight level is latched. This corresponds to setting flip-flop circuit 88 so as to prevent the contents of zero storage register 90 from being changed by subsequent changes in the representative weight signal. In addition to latching the zero weight level, the counter (such as B counter 84) is reset to a count of 1. Then, the representative weight is compared to the latched zero weight to determine whether this representative weight is equal to the zero weight level. If the representative weight is not equal to the zero weight level, the next incoming digital weight signal is read; and the foregoing operations are repeated. However, once the representative weight is equal to the latched zero weight, as when an object has been removed from the load cell and the load cell has returned to its no-load steady-state condition, the zero weight level is "unlatched". Then, the next incoming digital weight signal is read.

It is seen that the zero-adjustment operation is carried out until it is determined that the incoming digital weight signal is not within the weight window and that the flag had been set previously. Then, the zero weight level is latched and the weighing operation is carried out. In both the zero-adjustment and weighing operations, the representative weight is updated until 64 digital weight signals are included in this representative weight. At that time, both the representative weight and the count (representing the number of digital weight signals which are included in the representative weight) are divided by 2, and the operation for determining the statistical approximation of the actual weight is resumed. In the weighing operation, whenever the read digital weight signal is found to be outside the weight window, the representative weight is compared to the latched zero weight in order to determine when the load cell is returned to its no-load condition. Once this no-load (steady-state) condition is detected, the zero weight level is unlatched, and the zero-adjustment operation is carried out once again.

In the foregoing operation of the embodiment illustrated in FIGS. 3 and 4, the incoming digital weight signal is added to the weight-representing signal if it is within a predetermined range of the weight-representing signal, this predetermined range having been assumed to be equal to a numerical count of 4. Preferably, and because of the particular nature of conventional load cells, the predetermined range, or weight window, is equal to a numerical count of 4 if the incoming digital weight signal is greater than the weight-representing signal, and a numerical count of 20 if the incoming digital weight signal is less than the weight-representing signal.

While the present invention has been particularly shown and described with reference to certain preferred embodiments, it will be readily apparent to those of ordinary skill in the art that various changes and modifications in form and details may be made without departing from the spirit and scope of the invention. Some of these changes and modifications have been discussed above. It is appreciated that the foregoing numerical examples merely are illustrative. Other numerical values, such as the predetermined range or weight window, the particular counts attained by the respective counters, and the like all may exhibit different values, as desired. As mentioned previously, the A and B counters shown in FIG. 3 can be incorporated into a single counter. As another alternative to the functional block diagram shown in FIG. 3, comparator 58 may be supplied directly from the output of circuit 60 during the initializing, zero-adjustment and weighing operations, respectively, and need not be supplied with the weight signals via OR circuit 80, as discussed above. Furthermore, the initializing operation may be carried out to determine a tare weight. This is attained by placing a container on the load cell and then actuating reset switch 28. The zero-weight signal which ultimately is stored in zero storage register 90 is equal to the tare weight.

It is intended that the appended claims be interpreted as including the foregoing and previously-described alternatives and modifications, all within the scope of equivalents to which the present invention is entitled.

What is claimed is:

1. Apparatus for providing an indication of weight, comprising:
   a load cell for producing an output signal as a function of the weight of an object;
   means for providing successive digital weight signals corresponding to time-samples of said output signal;
   combining means for combining the digital weight signals to produce a weight-representing signal representing the statistical approximation of the actual weight;
   comparator means for comparing the latest digital weight signal to said weight-representing signal to determine if the difference therebetween is within a predetermined range and for adding said latest digital weight signal to said statistical approximation if said latest digital weight signal is within said predetermined range;
   counting means for counting the number of digital weight signals which are provided and which are within said predetermined range;
   means for resetting said counting means to a predetermined count and for clearing said combining means to produce a new weight-representing signal when a preselected number of digital weight signals are outside said predetermined range; and
   means for using said weight-representing signal as an indication of weight when said counting means reaches a preestablished count.

2. The apparatus of claim 1 further comprising means for setting said counting means to an initial count and for setting said combining means to an initial weight-representing signal in an initializing operation of said apparatus; and wherein said indication of weight is an indication of initial zero weight condition.

3. The apparatus of claim 1 wherein said means for resetting said counting means and for clearing said combining means comprises sensing means for sensing when two successive digital weight signals are outside said predetermined range.

4. The apparatus of claim 3 wherein said sensing means comprises means for setting a flag signal when a digital weight signal is outside said predetermined range; means for clearing said flag signal if the next following digital weight signal is within said predetermined range; and means for resetting said counting means and clearing said combining means if said next following digital weight signal is outside said predetermined range.

5. The apparatus of claim 4 further comprising means for inhibiting the latest digital weight signal from being added to said statistical approximation and for inhibiting the count of said counting means from being incremented if said latest digital weight signal is outside said predetermined range.

6. The apparatus of claim 5 wherein said combining means comprises summing means for providing a sum of the digital weight signals within said predetermined range and for adding the latest digital weight signal to said sum if said latest digital weight signal is within said predetermined range, and dividing means for dividing said sum by said count of said counting means; and wherein said means for resetting said counting means to a predetermined count and for clearing said combining means to produce a new weight-representing signal comprises means for resetting said counting means to a count of one and for replacing said sum with said latest digital weight signal.

7. Apparatus for providing an indication of weight, comprising:
 a load cell for producing an output signal representing the weight of an object;
 means for providing successive digital weight signals corresponding to time-samples of said output signal;
 combining means for combining the digital weight signals, said combining means including summing means for summing said digital weight signals and dividing means for dividing the sum of said digital weight signals by the number of digital weight signals included in said sum to produce a weight-representing signal;
 means for detecting when a pre-established number of digital weight signals are within a predetermined range of said weight-representing signal;
 zero storage means for storing said weight-representing signal as a zero weight signal when said pre-established number of digital weight signals within said predetermined range are detected;
 comparator means for comparing the latest digital weight signal to said zero weight signal to determine whether the difference between said latest digital weight signal and said zero weight signal is less than a predetermined amount;
 means for updating said weight-representing signal with said latest digital weight signal if said difference is less than said predetermined amount;
 counting means for counting the number of times said weight-representing signal is updated, the count of said counting means being supplied to the dividing means of said combining means for producing said weight-representing signal; and
 means responsive to a predetermined count of said counting means to set said counting means to a lower, preselected count, and to divide said sum of digital weight signals in said summing means by a factor determined by the ratio of said predetermined count to said preselected count.

8. The apparatus of clam 7 further comprising means for preventing the contents of said zero storage means from changing if said comparator means determines that said difference between said latest digital weight signal and said zero weight signal is greater than said predetermined amount.

9. The apparatus of claim 8 wherein said means for preventing includes sensing means for sensing when two successive digital weight signals differ from said zero weight signal by more than said predetermined amount.

10. The apparatus of claim 9 wherein said sensing means comprises means for setting a flag signal when a digital weight signal differs from said zero weight signal by more than said predetermined amount; means for clearing said flag signal if the next following digital weight signal differs from said zero weight signal by less than said predetermined amount; and means for preventing said contents of said zero storage means from changing if said next following digital weight signal differs from said zero weight signal by more than said predetermined amount.

11. The apparatus of claim 10 wherein said means for preventing said contents of said zero storage means from changing comprises latching means for latching said zero storage means to the contents then existing therein.

12. The apparatus of claim 11 further comprising means for setting said counting means to an initial count and for replacing said sum with said next following digital weight signal if said next following digital weight signal differs from said zero weight signal by more than said predetermined amount.

13. The apparatus of claim 12 further comprising weight storage means; and means for supplying said weight-representing signal to said weight storage means as a gross weight signal at least from the time that said zero storage means is latched.

14. The apparatus of claim 13 further comprising subtracting means for subtracting the contents of said zero storage means from the contents of said weight storage means to produce a net weight signal.

15. The apparatus of claim 14 further comprising means responsive to the latching of said zero storage means for supplying said gross weight signal to said comparator means in place of said zero weight signal, whereby said comparator means compares the latest digital signal to said gross weight signal to determine whether the difference therebetween is less than said predetermined amount.

16. The apparatus of claim 15 wherein said flag signal is set when a digital weight signal differs from said gross weight signal by more than said predetermined amount, and said flag signal is cleared if said next following digital weight signal differs from said gross weight signal by less than said predetermined amount; and wherein said counting means is set to said initial count and said sum is replaced with said next following digital weight signal if said next following digital weight signal differs from said gross weight signal by more than said predetermined amount.

17. The apparatus of claim 16 further comprising means for detecting when said net weight signal is less than a selected amount; and means for unlatching said zero storage means when said net weight signal is less than said selected amount, whereby said zero storage means is supplied with said weight-representing signal so as to change the contents thereof as said weight-representing signal changes.

18. The apparatus of claim 8 or 15, further comprising means for inhibiting the latest digital weight signal from being added to said sum of digital weight signals and for inhibiting the count of said counting means from being inhibited if said difference determined by said comparator means is greater than said predetermined amount.

19. Apparatus for providing an indication of weight, comprising:
 a load cell for producing an output signal representing the weight of an object;

means for providing successive digital weight signals corresponding to time-samples of said output signal;

combining means including summing means for summing said digital weight signals and dividing means for dividing the sum of said digital weight signals by a count representing the number of digital weight signals included in said sum to produce a weight-representing signal;

comparator means for comparing the latest digital weight signal to said weight-representing signal to determine if the difference therebetween is within a predetermined range and, if so, to add said latest digital weight signal to said sum, and, if not, to inhibit said latest digital weight signal from being added to said sum;

counting means for counting the number of digital weight signals which are added to said sum to produce said count;

means for setting the count of said counting means to a lower, preselected count when said counting means reaches a predetermined count and for dividing said sum by a factor corresponding to the ratio of said predetermined count to said preselected count, whereupon said counting means continues to count and said summing means continues to sum; and means for utilizing said weight-representing signal.

20. The apparatus of claim 19 further comprising means for sensing when two successive digital weight signals each is outside said predetermined range to set said counting means to an initial count and to replace said sum of digital weight signals with the latest digital weight signal.

21. The apparatus of claim 20 wherein said weight-representing signal represents a zero weight on said load cell.

22. The apparatus of claim 20 wherein said weight-representing signal represents the weight of an object on said load cell.

23. The apparatus of claim 20 further comprising zero storage means for receiving and storing the weight-representing signal; means for fixing the contents of said zero storage means to the centents then existing therein when each of two successive digital weight signals is outside said predetermined range; weight storage means for receiving and storing said weight-representing signal; and subtracting means for subtracting the contents of said zero storage means from the contents of said weight storage means to derive a net weight signal.

* * * * *